United States Patent [19]

Allen et al.

[11] 4,253,022

[45] Feb. 24, 1981

[54] INFRARED DETECTOR ARRAY ASSEMBLY WITH ATTACHED OPTICAL MICROPHONICS FILTER

[75] Inventors: David M. Allen, Garland; Charles M. Hanson, Richardson, both of Tex.

[73] Assignee: Texas Instruments Incorporated, Dallas, Tex.

[21] Appl. No.: 36,969

[22] Filed: May 8, 1979

[51] Int. Cl.³ .............................................. G01J 1/00
[52] U.S. Cl. .................................. 250/349; 250/352
[58] Field of Search ...................... 350/1.7, 1.6, 166; 250/332, 338, 352, 349

[56] References Cited

U.S. PATENT DOCUMENTS

| | | | |
|---|---|---|---|
| 3,103,585 | 9/1963 | Johnson et al. | 250/352 |
| 3,614,188 | 10/1971 | Seeley et al. | 350/1.6 |
| 3,963,926 | 6/1976 | Borrello | 250/332 |

Primary Examiner—Alfred E. Smith
Assistant Examiner—Carolyn E. Field
Attorney, Agent, or Firm—Melvin Sharp; James T. Comfort; Alva H. Bandy

[57] ABSTRACT

An infrared detector assembly comprising a substrate of suitable material such as sapphire, an infrared detector array attached to the substrate, a cold shield attached to the detector array, and an optical microphonics filter attached to the cold shield is disclosed. The optical microphonics filter includes a substrate of material having its major surfaces coated with layers of thin film coatings for passing a preselected frequency band, and a metalization for reflecting spurious energy impinging thereon thereby shielding the filter's substrate and coatings therefrom.

4 Claims, 6 Drawing Figures

INFRARED DETECTOR ARRAY ASSEMBLY WITH ATTACHED OPTICAL MICROPHONICS FILTER

This invention relates to infrared devices and more particularly to an infrared detector structure.

In the past infrared devices such as those disclosed in U.S. Pat. No. 3,851,173 issued Nov. 26, 1974 to Carol O. Taylor et al for a "Thermal Energy Receiver" have included an optical scanner, a detector array, an electro optics system, a vacuum module, and a refrigerator. A suitable optical scanner may be, for example, that disclosed in U.S. Pat. No. 3,781,559 issued Dec. 25, 1973 to Irwin E. Cooper, et al for a "Variable Field of View Scanning System." The detector array may be, for example, that disclosed in U.S. Pat. No. 3,963,926 issued June 15, 1976 to S. R. Barrello for a "Detector Cold Shield." The electro-optics module may be, for example, that disclosed in U.S. Pat. No. 3,742,238 issued June 26, 1973, to Richard G. Hoffman for a "Two Axis Angularly Indexing Scanning Display." The vacuum module may be, for example, that disclosed in the above referenced U.S. Pat. No. 3,851,173 issued Nov. 26, 1974, to Carol O. Taylor et al. The refrigerator may be, for example, that disclosed in U.S. Pat. No. 3,889,119 issued June 10, 1975 to Wicker et al for a "Cryogenic Cooler Off-Axis Drive Mechanism for an Infrared Receiver."

The detector array is in the path of incoming thermal energy scanned by the optical scanner. It is responsive to impinging thermal energy to produce electrical signals representative of the thermal energy image. The electrical signals of the detector array are processed for display in the electro-optical system.

The vacuum module, which is attached to the refrigerator, includes a vacuum jacket, a getter bowl and a stem feedthrough area. The vacuum jacket has a window through which the infrared energy passes to the detector area. Background radiation at temperatures approximately 300° Kelvin are generated, for example, by the vacuum module. This background radiation passes from the getter bowl and stem feedthrough area through the vacuum housing to the reat surface of the infrared energy admitting window from which it is reflected onto the detector elements. The vibrations generated, for example, by the refrigerator during operation vibrate the vacuum module jacket, window, stem, and radiation shield to such an extent that the radiation is fluctuated onto each detector element and in particular the end elements.

This fluctuating background radiation, hereinafter referred to as optical microphonics, appears as gray bars on the display. The contrast between the gray bars and the field is dependent upon the amplitude of the optical microphonics signals. These bars mask the scene of the display where they appear. Further, movement of the gray bars, resulting from the fluctuation frequency not being in synchronization with the scan frequency, masks even more of the scene. If the structure is vibrating at a frequency equal to the scan frequency or a multiple thereof, (N) (scan rate), then the gray bars are stationary. But if the structure is vibrating at a frequency other than at the scan frequency (N+α) (scan rate), the bars move.

Many unsuccessful approaches for the elimination of these moving gray bars have been made. For example baffles were used in the vacuum module in an effort to block and trap radiation to prevent it from ever reaching the detector. Baffles proved objectionable in that they created a new source of optical microphonics. In another attempt to remove the vibration, the refrigerator was removed from the vacuum module. While this did tend to reduce the optical microphonics it increased the cost of the system and its size. Still other attempts included: shortening or removing the radiation shield to move the modulator out of the radiation's path, altering the radiation shield lip to control reflections away from the detector, shortening the vacuum module jacket and silicon cold shields, or adding a tall metal cold shield about the detector in the stem feedthrough area. It was believed that a tall cold shield would not be a source of optical microphonics as it would be cooled to the temperature of the detector. Nevertheless, it was noted that each of these approaches failed to provide a good practical solution to the optical microphonics problem. Thus, it was concluded that the reflections from the rear surface of the window must be striking the detector and that any solution would require keeping the reflected energy away from the detector.

Accordingly, it is an object of this invention to provide an improved infrared detector structure for reducing substantially the amount of spurious infrared energy reaching the detector.

Still another object of the invention is to provide an infrared detection structure having a means for reflecting background modulated radiation from the detector.

Briefly stated the invention comprises an optical microphonics filter. The filter includes a substrate of suitable material having thin film optical coatings on its major surfaces to establish the desired infrared energy bandpass characteristics. A metalized coating is selectively applied to the top and sides of the filter substrate to form an aperture on the filter.

The novel features characteristic of this invention may best be understood by reference to the following detailed description when read in conjunction the the accompanying drawings, wherein.

Figure 1:
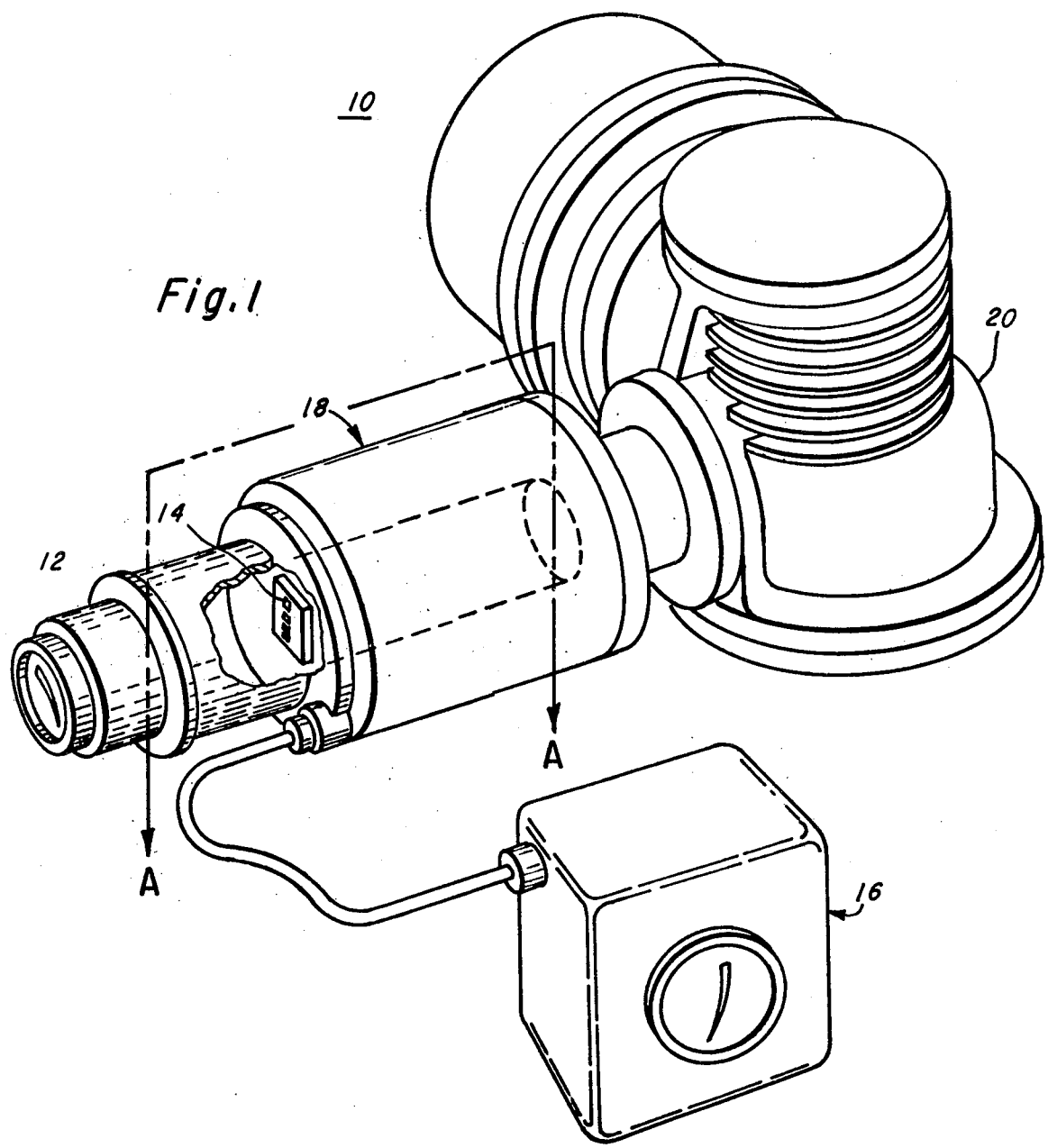
FIG. 1 is an isometric view of the infrared receiver utilizing the optical microphonics filter.

Referring to the drawings, the thermal radiation receiver 10 (FIG. 1) comprises: an optical scanner 12 for scanning a scene emanating thermal energy, a detector array 14 for receiving the thermal energy of the scene and producing electrical signal indicative thereof, an electro optical device 16 for converting the electrical signals to light signals to produce a visible display of the scene, a vacuum module 18 attached to the refrigerator for providing a dewar for the detector array supported therein, and a refrigerator 20 for cooling the detector of its operating temperature.

Figure 2:
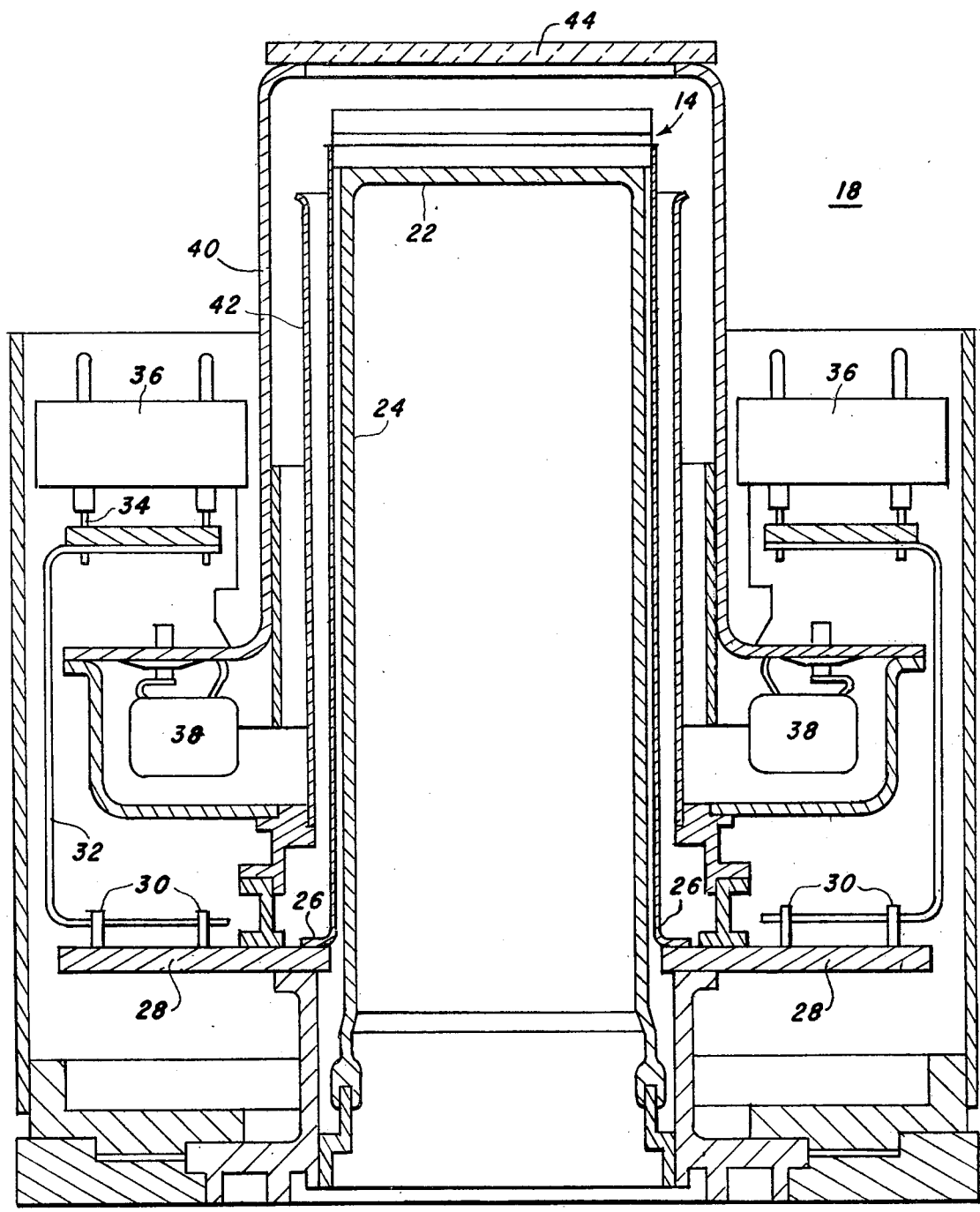
FIG. 2 is a cross sectional view of the detector (vacuum module) taken along the line A—A of FIG. 1.

Referring now to FIG. 2, the vacuum module 18 comprises a stem 22 to which the detector assembly 14 is attached. Stem 22 has a cylindrical portion 24 on which electrical conductors or leads are formed. Portions of the electrical leads 26 are supported on a ceramic substrate 28 and are connected by electrical pins 30 to first ends of electrical leads of a flex strip 32. Electrical pins 34 connect second ends of the flex strip 32 to a main connector 36 leading to the electro optics device 16 (FIG. 1). A getter 38 (FIG. 2) maintains a vacuum in the area between the cylindrical wall 24 and an outer cylindrical wall of vacuum housing 40 of the vacuum module. A shield 42 surrounds the stem's cylindrical wall 24. The shield 42 is to protect the cylinder 24 from the action of the getter and to reduce thermal heat leak from the vacuum housing 40. The end of cylindrical wall 40 adjacent the detector assembly 14 includes a window 44 to admit the scanned infrared energy enamating from the scene to the detector of the detector assembly 14.

Figure 3:
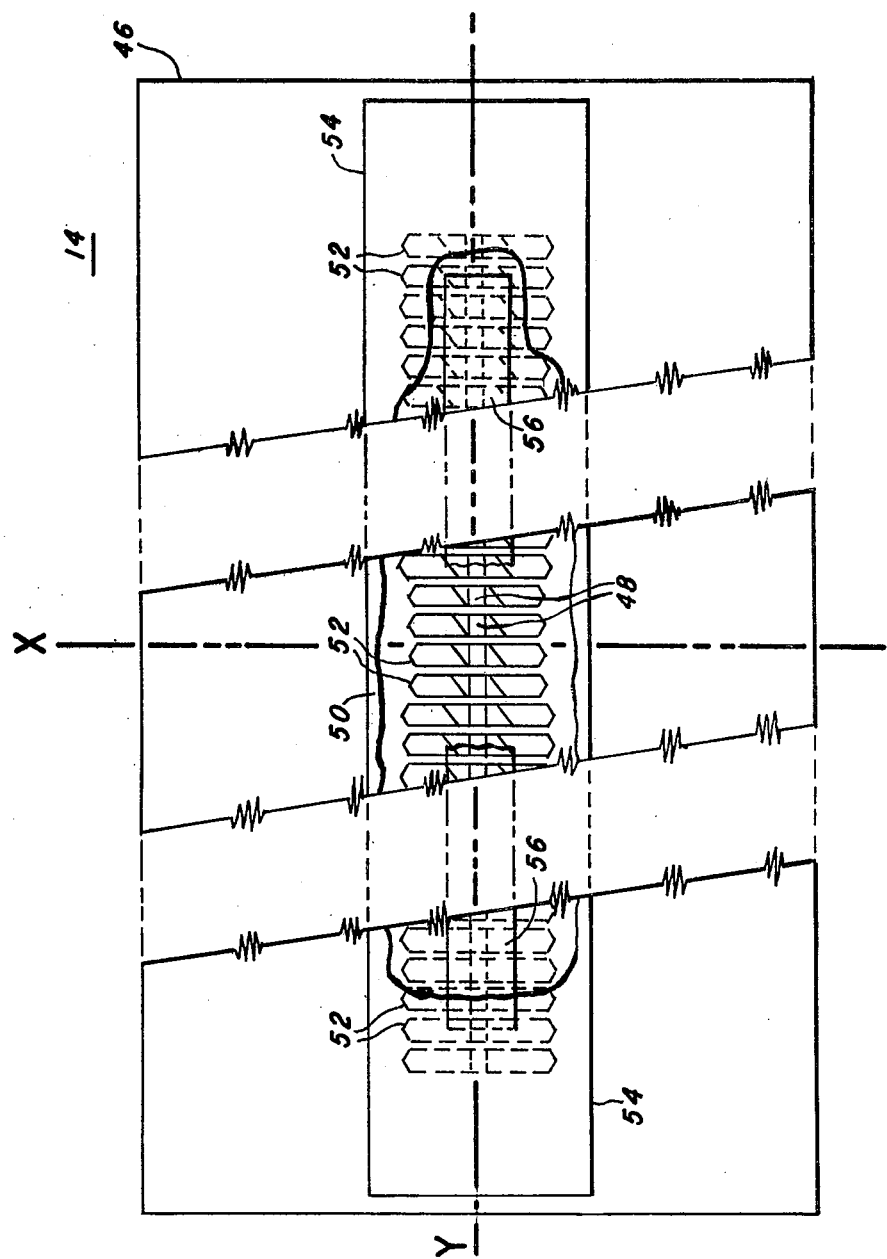
FIG. 3 is a plan view of the detector/cold shield assembly.
Figure 4:
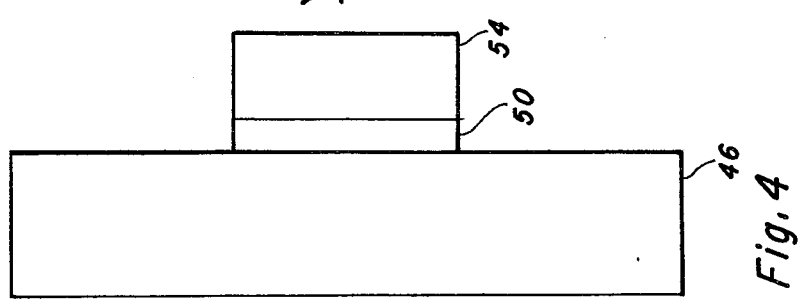
FIG. 4 is a side view of the detector/cold shield assembly.

Referring now to FIG. 3, the detector array assembly 14 comprises a detector supporting substrate 46 which may be for example a sapphire substrate. The substrate 46 is attached by a suitable epoxy to the end of stem 22 of cylinder 24 (FIG. 2). An array of detectors 48 (FIG. 3) is attached to the detector substrate 46 by, for example, a suitable epoxy. The detector array may be, for example, a mercury, cadium, telluride (Hg, Cd, Te) detector array of about, for example, 200 elements. Of the 200 elements only 180 are actually used. That is, ten elements on each end of the array are not electrically connected. Portions of these unconnected elements are shown in dotted lines on the ends of the detector array. A cold shield 50 is attached to the detector array 48 using a suitable epoxy. The cold shield 50 has a plurality of preferentially etched apertures 52 therein. The plurality of apertures 52 correspond in number to the number of detector elements in the detector array. Only the edges of the cold shield apertures in the Y direction shield the detectors from spurious energy and this energy is that coming from the Y-coordinate direction. The edges of the cold shield in the X-coordinate direction do not shield the detector elements from spurious energy arriving from the X-coordinate direction. Thus, to shield the detectors from spurious energy arriving from the X-coordinate direction and from the window 44 an optical microphonics filler 54 having a preselected long wavelength bandpass corresponding to that of the housing window is attached to the cold shield 50. Epoxy is used to attach the optical microphonics filter 54 to the cold shield 50. The optical microphonics filter 54 has an aperture 56 which extends beyond the ends of the active elements of the detector array, and the edges of the row of the detector elements. FIG. 4 shows an end profile view of the detector array assembly including the detector supporting substrate 46 supporting the cold shield 50 and the optical microphonics filter 54.

Figure 5A:
FIG. 5a-5d depict steps for fabricating the optical microphonics filter.
Figure 5B:
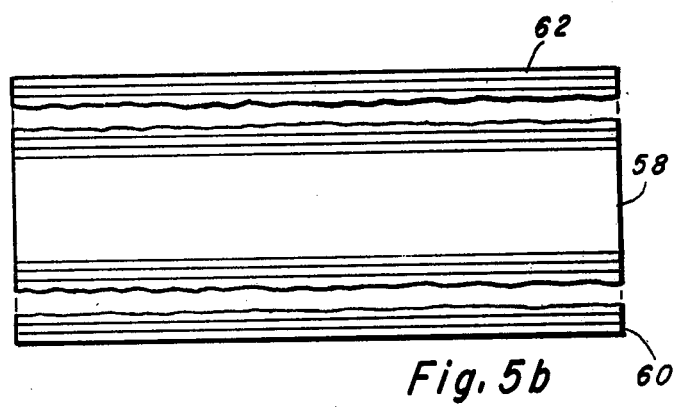
Figure 5C:
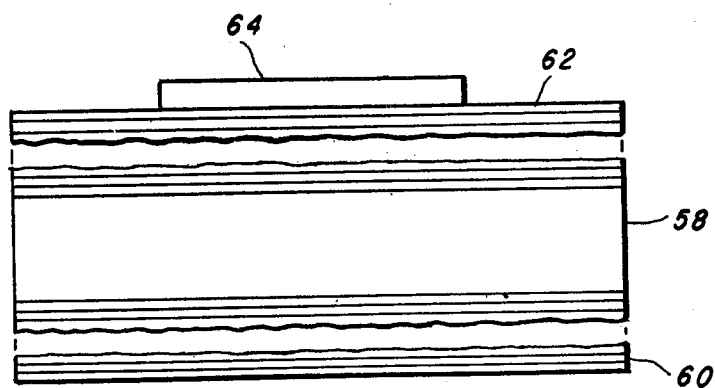
Figure 5D:
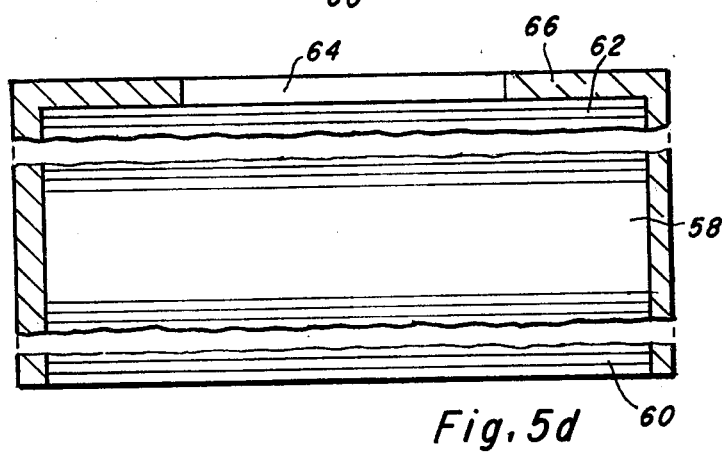
Figure 6:
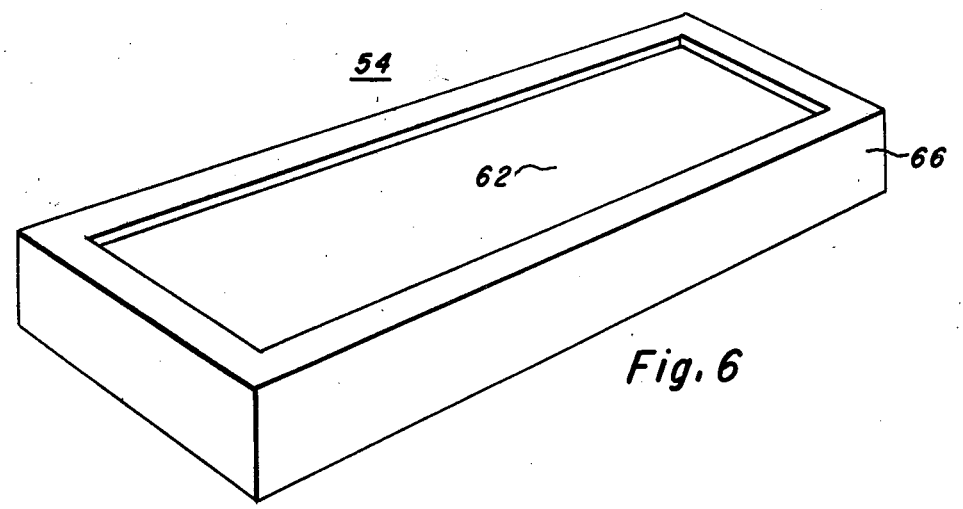
FIG. 6 is an isometric view of the optical microphonics filter.

Referring not to FIGS. 5a–5d in which the fabrication steps are shown. A polished substrate (FIG. 5a) of infrared transmissive material 58 such as, for example, zinc sulfide, infrared glasses or semiconductor material such as silicon, germanium, or indium antimonide is thin film coated on a first surface of its major surfaces with long wavelength pass (LWP) layers 60 of optical materials and a second surface of its major surfaces with bandpass (BP) layers 62 (FIG. 5b). Silicon is preferred as its thermal expansion coefficient most closely approximates that of the silicon cold shield 50. As such coatings are well known to those skilled in the art only the filter parameters for an infrared window transmitting in the 7.5 μm to 11.75 μm are described here. The parameters are preferably as follows: transmittance at 0° incidence at 77° K ± 5° K, T =50% Absolute at 7.5 μm T =50% Absolute at 11.75 μm After thin film coating, the thin film coats 62 are masked with a photoresist 64 (FIG. 5c) and the top and side surfaces metalized with a metal 66. Metalization is done by, for example, sputtering chromium, platinum, gold or aluminum. Sputtering platinum is preferred because sputtering permits the metal to be evenly deposited over the sides and upper edges of the substrate, and platinum has the greatest adherence to the optical coatings. After metalization the mask 64 is removed using a suitable solvent. The removal of the mask completes the optical microphonics filter 54 (FIG. 6). A suitable optical microphonics filter is that sold by Texas Instruments Incorporated by part number 335936.

In operation, spurious thermal energy is conducted from the getter bowl and stem feedthrough are through the vacuum housing to the window 44. Spurious energy having a wavelength in the bandpass of the window passes through the window; all other wavelengths are reflected toward the detector array. The spurious energy which would strike the detector elements is reflected away by the optical microphonics filter 54. Energy of the desired wavelength passes through the optical microphonics filter 54 to the detector array 14. The filter is protected from other spurious energy within the housing by the metalization.

Although only a single embodiment of this invention has been described herein, it will be apparent to a person skilled in the art that various modifications to the details of construction shown and described may be made without departing from the scope of this invention.

What is claimed is:

1. An infrared detector array assembly comprising:
   (a) a housing having a supporting member and a window, said window being oppositely disposed as to the supporting member and having a preselected long wavelength bandpass;
   (b) a detector array mounted on the supporting member; and
   (c) an optical microphonics filter attached to the detector array and in optical alignment therewith, said filter having a preselected long wavelength bandpass corresponding to that of the housing window for passing energy of selected wavelengths to the detector array and reflecting spurious energy having wavelengths outside the selected bandpass.

2. An infrared detector array assembly according to claim 1 wherein the optical microphonics filter is attached to the detector array by an epoxy.

3. An infrared detector array assembly comprising:
   (a) a housing having a supporting member and a window, said window being oppositely disposed as to the supporting member and having a preselected long wavelength bandpass;
   (b) a detector array mounted on the supporting member;
   (c) a cold shield attached to the detector array; and
   (d) an optical microphonics filter attached to the cold shield in optical alignment with the detector array, said filter having a preselected long wavelength bandpass corresponding to that of the window for passing energy of selected wavelengths to the detector array and reflecting spurious energy having wavelengths outside the selected bandpass.

4. An infrared detector array assembly according to claim 3 wherein the optical microphonics filter is attached to the cold shield by an epoxy.

* * * * *